US009709376B2

(12) United States Patent
Zhe et al.

(10) Patent No.: US 9,709,376 B2
(45) Date of Patent: Jul. 18, 2017

(54) HIGH SENSITIVITY INDUCTIVE SENSOR FOR MEASURING BLADE TIP CLEARANCE

(71) Applicants: Jiang Zhe, Copley, OH (US); Li Du, Akron, OH (US)

(72) Inventors: Jiang Zhe, Copley, OH (US); Li Du, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 57 days.

(21) Appl. No.: 14/710,119

(22) Filed: May 12, 2015

(65) Prior Publication Data

US 2015/0323301 A1  Nov. 12, 2015

Related U.S. Application Data

(60) Provisional application No. 61/991,848, filed on May 12, 2014.

(51) Int. Cl.

| G01B 7/02 | (2006.01) |
|---|---|
| G01B 7/14 | (2006.01) |
| F01D 11/14 | (2006.01) |
| F01D 11/20 | (2006.01) |
| F01D 21/00 | (2006.01) |
| F01D 21/04 | (2006.01) |

(52) U.S. Cl.
CPC .............. *G01B 7/14* (2013.01); *F01D 11/14* (2013.01); *F01D 11/20* (2013.01); *F01D 21/003* (2013.01); *F01D 21/04* (2013.01); *G01B 7/023* (2013.01)

(58) Field of Classification Search
CPC ........ F01D 11/14–11/20; F01D 21/003–21/04; G01B 7/023–7/14

USPC ....................... 324/207.11–207.26
See application file for complete search history.

(56) References Cited

U.S. PATENT DOCUMENTS

| 7,259,552 B2* | 8/2007 | Twerdochlib | G01B 7/14 324/207.16 |
|---|---|---|---|
| 7,605,595 B2* | 10/2009 | May | G01B 7/14 324/662 |
| 7,618,712 B2* | 11/2009 | Sabol | F01D 21/003 428/210 |
| 8,180,585 B2* | 5/2012 | Cech | B60R 21/0136 324/228 |
| 9,325,388 B2* | 4/2016 | Bevly, III | F01D 17/02 |
| 2004/0018644 A1* | 1/2004 | Johnson | G01R 33/022 324/207.13 |
| 2008/0231263 A1* | 9/2008 | Rebmann | G01D 5/142 324/207.11 |
| 2014/0091785 A1* | 4/2014 | Wherritt | G01B 7/14 324/207.15 |

* cited by examiner

*Primary Examiner* — Melissa Koval
*Assistant Examiner* — Rahul Maini
(74) *Attorney, Agent, or Firm* — Renner, Kenner, Greive, Bobak, Taylor & Weber Co., LPA

(57) ABSTRACT

A high sensitivity inductive sensor for measuring clearance of a rotating blade tip includes a one or more of sensing coils. The sensing coils are formed of magnet wire, which is wound to form planar spiral coils. Each of the coils are coupled in series with a function generator, which applies an excitation signal thereto. Accordingly, based on the change in impedance of the coils, a clearance measurement, which identifies the distance between the coil and the tip of the rotating blade can be obtained using predetermined calibration curve values.

19 Claims, 15 Drawing Sheets

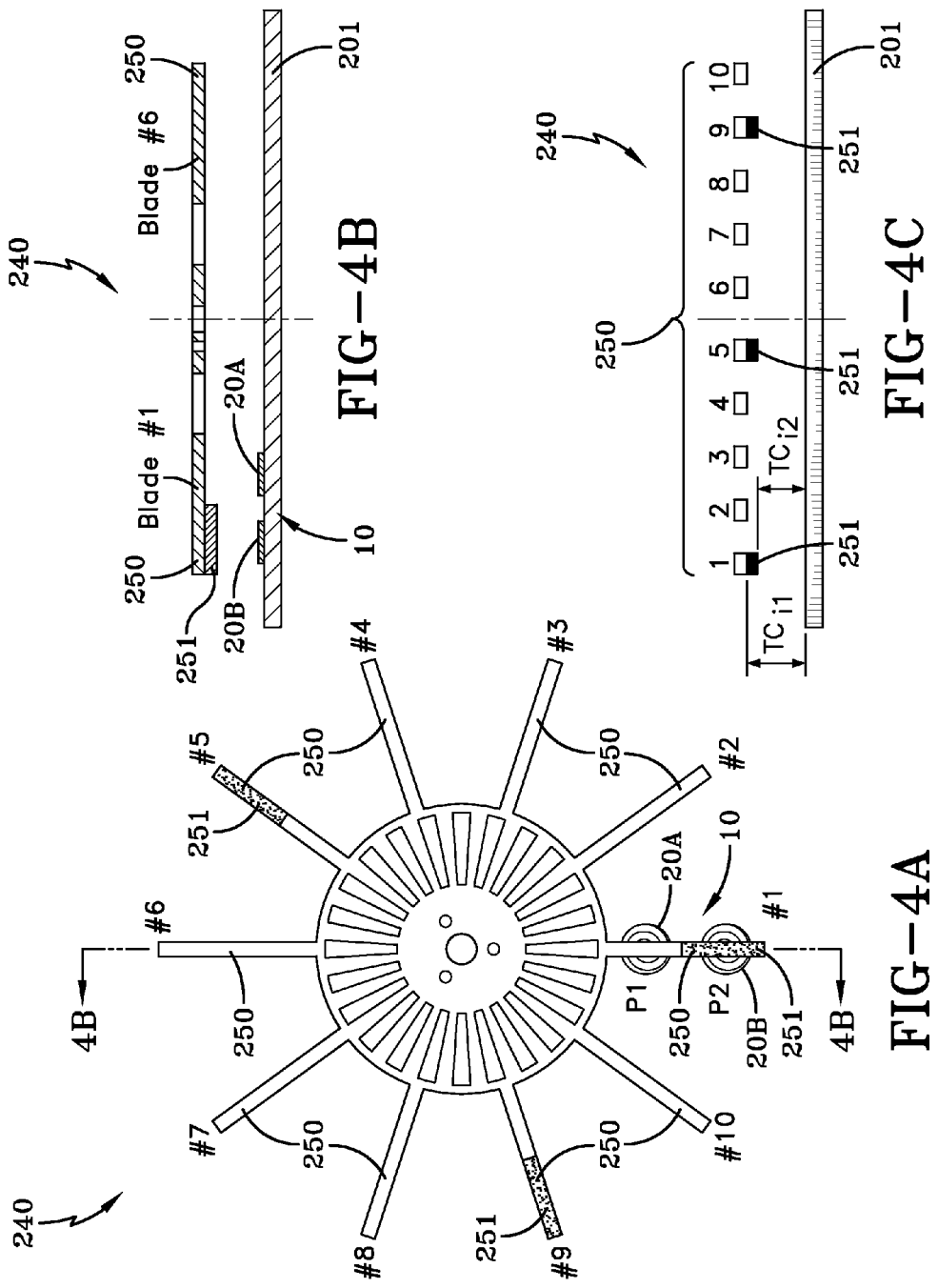

Table 1. Measured tip clearances at positions P1 and P2 before dynamic testing (unit:mm)

| Blade/Coil | 1 | 2 | 3 | 4 | 5 | 6 | 7 | 8 | 9 | 10 |
|---|---|---|---|---|---|---|---|---|---|---|
| | | | | | $TC_{12}$ = 1.20mm | | | | | |
| 1 (20A) | 2.21 | 2.57 | 2.59 | 2.46 | 2.42 | 2.46 | 2.53 | 2.41 | 2.35 | 2.27 |
| 2 (20B) | 1.20 | 2.57 | 2.58 | 2.46 | 1.43 | 2.46 | 2.54 | 2.41 | 1.36 | 2.26 |
| | | | | | $TC_{12}$ = 3.60mm | | | | | |
| 1 (20A) | 4.60 | 4.97 | 4.99 | 4.86 | 4.83 | 4.86 | 4.93 | 4.80 | 4.76 | 4.67 |
| 2 (20B) | 3.60 | 4.98 | 4.97 | 4.87 | 3.84 | 4.85 | 4.94 | 4.82 | 3.75 | 4.67 |

FIG-6

HIGH SENSITIVITY INDUCTIVE SENSOR FOR MEASURING BLADE TIP CLEARANCE

CROSS-REFERENCE TO RELATED APPLICATION

This application claims the benefit of U.S. Provisional Application No. 61/991,848 filed May 12, 2014, the contents of which are incorporated herein by reference.

TECHNICAL FIELD

Generally, the present invention relates to measurement devices. Particularly, the present invention relates to devices for measuring the clearance between the tip of a rotating blade, such as that of a turbine, and a housing within which the blade rotates. More particularly, the present invention relates to a measurement device for measuring the clearance between the rotating blade tip and the housing within which the blade rotates using multiplexed inductive sensing coils.

BACKGROUND OF THE INVENTION

The efficiency and performance of rotary machinery, such as gas turbine engines and air compressors, are highly dependent on blade tip clearance. Specifically, blade tip clearance or tip clearance (i.e. TC) is defined herein as the distance between the tip of the rotating blade and the casing/housing within which the blade rotates. Insufficient tip clearance results in the rubbing of the blade tip against the casing/housing that the blade rotates within, and as such, can result in damage to the housing, the blade, or both. Alternatively, excessive tip clearance generally results in a significant increase in power loss and operating efficiency, such as in the case of turbines. Thus, tip clearance monitoring has become essential in detecting and predicting blade failure or structural damage suffered by the blade before it occurs.

In order to monitor blade tip clearance, several techniques have been developed. For example, capacitive methods have been developed due to their low cost and simple operational structure. However, the measured capacitance change often reflects not only the blade tip clearance variation, but also changes in the dielectric property of air that is caused due to changes in pressure and humidity of the surrounding environment. This, in turn, creates measurement inaccuracies, leading to difficulty in accurately measuring the tip clearance of a rotating blade. Alternatively, optical methods have been used to measure tip clearance with high accuracy. However, such optical methods also suffer from inaccurate measurements, which are due to debris contamination of the optical sensors used by such detection systems. Yet another tip clearance measurement technique is a microwave detection method, which is based on measuring the change in amplitude of a reflected microwave signal from a blade tip. While this technique is not affected by the presence of debris, as in the optical measurement system, the microwave detection method has difficultly performing measurements when the blade thickness is small. Another disadvantage of the optical and microwave blade tip clearance measurement methods is that in order to accommodate a sensing probe used to perform such measurements, a large through hole, which is typically larger than 10 mm in diameter, is required to be bored through the casing that encloses the rotary blades. As such, the use of such optical and microwave blade tip sensors on small-scale rotary devices, such as a turbine, is impractical.

A non-intrusive inductive blade tip clearance sensor, which is formed of 3-D solenoids that are wound around a magnetic core, has also been developed to conduct dynamic measurements of the tip clearance of rotor blades with the outside of a turbine engine casing. While this method does not require a through hole to be bored through the casing, such sensor is more sensitive to the relative vibration between the casing and the sensor. In addition, the non-intrusive sensor does not work for a casing that contains ferrous material, as such ferrous casings significantly reduce the penetrating magnetic field, and thus the output signal. Alternatively, intrusive inductive sensors have been developed and have gained considerable success for their simple structure, low cost and easy installation. However, one drawback of such inductive sensors is their low resolution. For example, such sensors cannot detect a variation in tip clearance of less than 50 um, due to the bulk size and low sensitivity of the measurement circuit utilized. Furthermore, inductive tip clearance sensors of current designs can only detect blade tip clearance at one specific location along the blade's camber line. However, during turbine engine operation, abnormal tip clearance could occur at any position along the camber line of the blade. Further, advanced health monitoring and active tip clearance control typically requires blade tip clearance measurements at multiple locations along the camber line of the blade. While multiple inductive sensors and measurement circuitries can be used to measure the dynamic tip clearance at multiple locations, implementation of such detection electronics would be complex and impractical for real-time monitoring of multiple tip clearances simultaneously.

Therefore, there is a need for a high-sensitivity inductive sensor for measuring blade tip clearances that utilizes multiple miniature-sized, spiral planar coils as sensing elements. In addition, there is a need for a high-sensitivity inductive sensor for measuring blade tip clearance that can be mounted on an inner surface of a turbine engine casing along the camber line of the turbine's rotor blade. Additionally, there is a need for a high-sensitivity inductive sensor for measuring blade tip clearance that utilizes resonance frequency division multiplexing (RFDM), which enables the simultaneous measurement of multiple, highly dynamic, blade tip clearances using only one set of measurement circuitry, with increased sensitivity.

SUMMARY OF THE INVENTION

In light of the foregoing, it is a first aspect of the present invention to provide a sensor for measuring a clearance of a rotating metallic structure, the sensor comprising a plurality of series coupled wire coils, with each coil being coupled in parallel with a capacitor; and a controller coupled in series with the plurality of wire coils, the controller being configured to generate a combined AC (alternating current) signal that includes a plurality of sine waves that are each respectively associated with one of the plurality of wire coils; wherein the controller measures the change in inductance of the plurality of wire coils caused by the position of the rotating structure relative to the plurality of wire coils, such that the change in inductance is associated by the controller with a measurement of the clearance between the plurality of wire coils and the metallic structure.

BRIEF DESCRIPTION OF THE DRAWINGS

These and other features and advantages of the present invention will become better understood with regard to the following description, appended claims, and accompanying drawings wherein:

FIG. 4A is a top plan view of a disc having a plurality of blades for testing the inductive sensor in accordance with the concepts of the present invention;

FIG. 4B is a cross-sectional view in the direction of line 4B-4B of FIG. 4A in accordance with the concepts of the present invention;

FIG. 4C is a side elevational view of the blade tips of FIG. 4A in accordance with the concepts of the present invention;

FIG. 6 is a chart showing the measured blade tip clearances by inductive sensors at positions P1 and P2 in accordance with the concepts of the present invention;

DETAILED DESCRIPTION OF THE INVENTION

Figure 1:
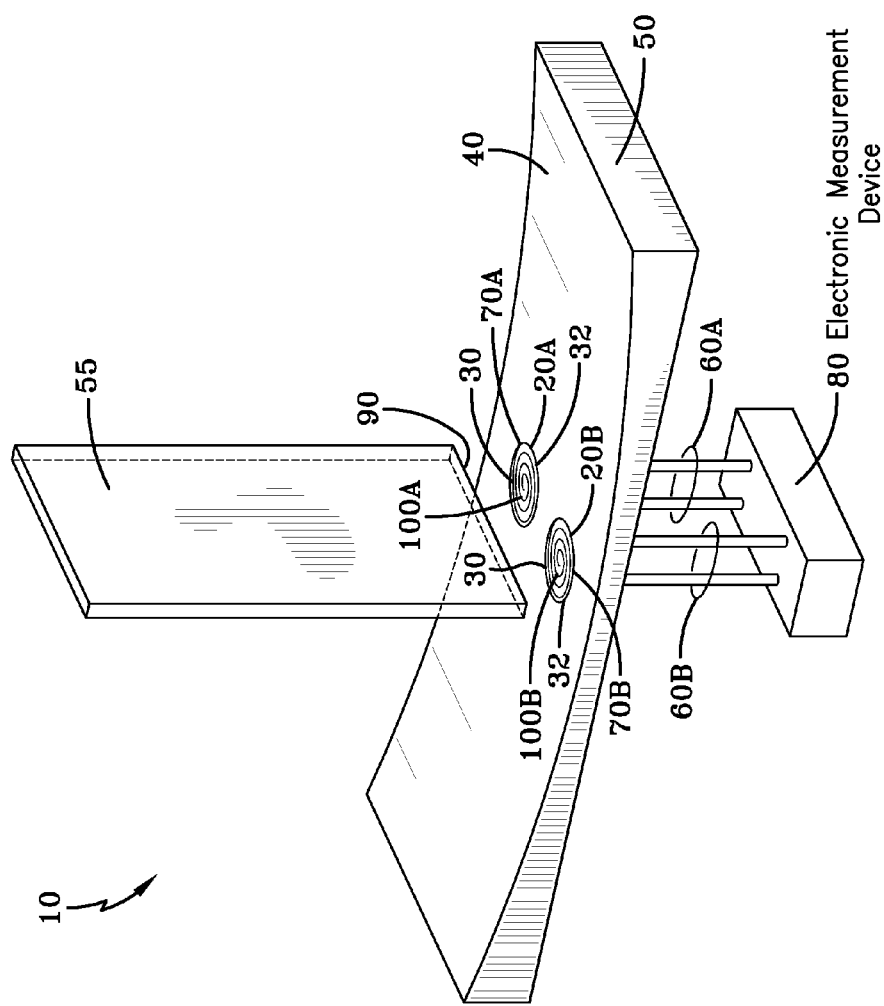
FIG. 1 is a perspective view of an inductive sensor for measuring the clearance between a blade tip and an outer casing of a turbine in accordance with the concepts of the present invention.
Figure 2:
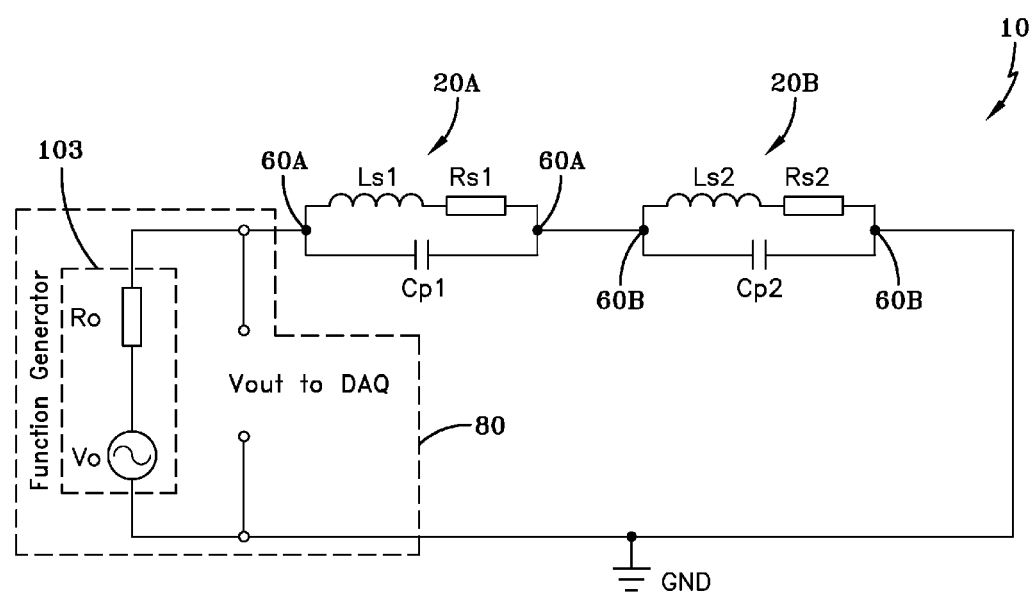
FIG. 2 is a schematic view of an equivalent measurement circuit of the inductive sensor of FIG. 1 in accordance with the concepts of the present invention.

A high-sensitivity inductive sensor for measuring blade tip clearance (TC) is generally referred to by numeral 10, as shown in FIGS. 1 and 2 of the drawings. While the following discussion relates to the use of the sensor 10 to measure clearance of a tip of a rotating blade, the sensor 10 can be used to measure any dynamic clearance dimension of a moving or rotating metallic surface, such as that provided by a blade or other structure, and the sensor 10. Specifically, the sensor 10 includes two miniaturized or mini-sized, spiral sensing coils 20A and 20B. Each of the sensing coils 20A and 20B may be disposed between an upper dielectric substrate 30 and a lower dielectric substrate 32. Each sensing coil 20A-B comprises a planar spiral coil that is made of magnet wire that is about 200 um in diameter. It should be appreciated that such coils 20A-B may be fabricated using any suitable process or technique, such as by machining or micro-fabrication for example. However, the sensing coils 20A-B may take on any other suitable diameter, and may be formed of any suitable metal wire. In addition, in other embodiments, the coils 20A-B may be formed, so as to have one or more layers of coils (i.e. stacks of a plurality of coils) to improve the sensitivity or response of the sensor 10. In addition to being arranged as a spiral, the wires forming the coils 20A-B may be arranged so that the coils 20A-B have any suitable shape, such as square, rectangular, hexagonal for example. It should also be appreciated that the coils 20A-B are formed of any number of wire turns.

The upper and lower dielectric layers 30 and 32 may be formed as thin ceramic layers, which electronically isolate the coils 20 A-B, while also protecting the coils 20A-B from high speed, high pressure gas flow, and extreme temperatures of the surrounding environment. In other embodiments, the dielectric layers 30 and 32 may comprise any suitable material, which is electrically non-conductive and heat-resistant. For example, the dielectric layers 30 and 32 may include high temperature insulation materials, such as SiC, $Si_3N_4$, etc. It should also be appreciated that the wires forming the coils 20A-B may be formed of wire that can withstand high temperatures, such as Platinum (Pt) and Tungsten (W) wires. Furthermore, in other embodiments, the thickness of the sensor 10 may be configured to have any suitable dimension, such as for example, 0.5 mm or less.

The sensor 10 may be mounted, such that the coils 20A-B are positioned on or near an inner surface 40 of a casing 50, such as a rotor casing, within which one or more blades 55 of a turbine, or other device, such as an air compressor, rotate. For example, in one embodiment, the sensor 10 may be attached or embedded in the inner surface 40 of the casing 50. Electrically conductive wires 60A and 60B which are connected to the respective coils 20A and 20B of the sensor 10 are routed through respective bores 70A and 70B that are disposed through the casing 50, and are coupled to an electronic measurement device or controller 80. That is, the coils 20A-B are mounted in respective bores 70A-B, so as to be flush or nearly flush with the inner surface 40 of the casing 50. It should be appreciated that in some embodiments, the bores 70A and 70B may have any suitable dimension, such as about 1 mm for example, which are substantially smaller than that used by prior art optical and microwave sensors previously discussed.

Thus, as the blades the blade(s) 55 of a rotor or other device rotates within the casing 50, whereupon a tip 90 of the blade 55 sweeps past a top surface 100A and 100B of respective sensing coils 20A-B at a high speed, an eddy current is induced in the blade(s) 55. This eddy current causes a negative inductance change in each of the sensing coils 20A-B. The smaller the clearance between the tip 90 of the blade(s) 55 and the inner casing surface 40, results in a larger eddy current being induced in the blade tip 90, which translates into a greater inductance drop being experienced by each of the coils 20A-B. As such, as the distance between the blade tip 90 and the inner casing surface 40 (i.e. which defines the blade tip clearance TC) increases, the inductance of the coils 20A-B increases; and as the blade tip clearance decreases the inductance of the coils 20A-B decreases.

In one embodiment, the sensor 10 is configured such that the planar coils 20A and 20B have about a 5 mm outer diameter (Dcoil) and about a 0.8 mm inner diameter. However, it should be appreciated that the coils 20A-B may have any suitable inner and outer diameter dimension. Such a configuration ensures that the coils 20A-B are sensitive to the blade tip clearances (TC) that are in a range from about 0 to 5 mm. It should be appreciated that the coils 20A-B may be formed of a wire having any suitable diameter, such that a smaller wire diameter (Dwire) permits more coil turns, and thus generates a higher magnetic flux density. On the other hand, a smaller wire diameter (Dwire) permits more coil turns, and thus generates higher magnetic flux density. In addition, a smaller wire diameter (Dwire) results in a smaller quality factor Q (i.e $2\pi f L_s/R_s$) and consequently a lower sensor sensitivity. Thus, to obtain the desired sensitivity characteristics, a magnetic wire having a wire diameter (Dwire) of about 0.2 mm (AWG 32) was used to form the coils 20A-B, discussed herein.

Sensor Coil Fabrication

The following discussion relates to one embodiment for fabricating the coils 20A-B of the sensor 10, however, for the sake of brevity the following discussion relates to the formation of only coil 20A. It should be appreciated however, that any suitable technique may be used to fabricate the coils 20A-B. Specifically, the coil 20 A was fabricated by drilling a 1 mm through hole or bore in a glass slide. Next, the glass slide and another glass slide without a hole were spaced apart, using any suitable spacer, by a gap of about 210 um. A glass tube of about 0.8 mm in diameter was inserted through the central hole. Next, the magnet wire was wound around the glass tube within the gap to form a 10-turn spiral coil 20A. A small amount of epoxy was applied on the surface of the magnet wire to retain the shape of the spiral coil 20A during the wire winding process. Once the sensing coil 20A was formed, the upper glass slide was removed and the mini-sized spiral planar coil 20 was then peeled off from the bottom of the glass slide. As a result of such process, the formation of the thin, compact inductive sensing coils 20A and 20B were completed.

To test the sensor 10, the coils 20A-B were attached to a surface of a substrate, which was used to mimic an engine or turbine casing. The center to center distance between the coils 20A-B was about 11 mm to avoid cross-talk, but may be spaced apart at any suitable distance. To utilize the planar coils 20A-B in blade tip clearance measurements, a thin layer of ceramic adhesive (RESBOND 919, Cotronics Corp.) was applied to the top of the sensing coil, and cured for electrical insulation and protection. In contrast to other blade tip sensors, the through hole that is required by the present invention on the casing that is required for wire connections with external electronics can be made very small. As a result, less destruction is caused to the casing, less disturbance is imparted to the operation of the rotary system, and less degradation is imparted to the performance of the tested engine or rotary system. After the sensing coils 20A-B were built, the series resistance Rs and series inductance Ls were measured to be about 0.56 Ohms and 0.72 uH, respectively. With an excitation frequency of about 2 MHz, the Q factor of the sensing coils 20A-B was calculated to be about 16.2.

The operating mechanism for completing a blade tip measurement includes applying an AC (alternating current) excitation signal to each sensing coil 20A-B to generate a magnetic field. The passage of the blade(s) 55 across a sensing coil 20 induces an eddy current inside the blade 55, which generates a magnetic field that is opposite to the original magnetic field. As a result, the total magnetic flux is deceased, leading to a decrease in the inductance Ls of the coil 20. The higher the frequency of the AC excitation signal, the larger the eddy current, and therefore the larger the drop in the coil 20 inductance Ls of the coils 20A-B. In addition, a higher excitation frequency results in a shorter response time, making it possible for the sensor 10 to detect blade tip clearance for high speed rotating machinery. On the other hand, the use of a high frequency AC (alternating current) excitation frequency requires a high sampling rate and fast signal processing to handle the large amount of collected data. Thus, in one embodiment, the AC excitation frequency was determined to be about 2 MHz, although any suitable frequency may be used.

To verify that there is negligible mutual interference (crosstalk) between the two sensing coils 20A-B at the measurement frequency (2 MHz) the following experiments were performed. First, a 10 Vpp, 2 MHz sine wave was applied across coil 20A (V1) and coil 20B (V2) using a digital oscilloscope. The coupling coefficient k between coil 20A and coil 20B, where k=V2/V1, was calculated to be about 0.0081. Next, to mimic the presence of a ferrous blade, a stainless steel plate [25.4 mm (L)×25.4 mm (W)×1 mm (H)] was placed above the two sensing coils 20A and 20B with a gap that varied from 10 um to 5 mm between the plate and the surface of the coils 20A-B. The measured k value ranged from 0.001 to 0.007. The reduction in the k value when a ferrous object is present is due to the fact that at a high excitation frequency (2 MHz), the eddy current is significant in the ferrous plate, which produces a magnetic field that opposes the original magnetic field, and tends to decrease the mutual magnetic flux. Nevertheless, these measurement results indicate that the mutual interference between the two sensing coils 20A-B is negligible.

Resonance Frequency Division Signal Multiplexing Measurement

To dynamically monitor the clearances of a blade at various positions along the camber line of one or more rotating blades, multiple planar coils 20A-B were utilized with a resonance frequency division signal multiplexing technique. As such, it was demonstrated that the inductive tip clearance sensor 10 with two sensing coils 20A and 20B positioned on the engine casing along the camber line of a blade was able to measure blade tip clearances at two different positions, as shown in FIG. 1. However, it should be appreciated that other techniques for acquiring the blade tip clearance measurement data from the coils 20A-B may be used.

FIG. 2 shows the equivalent measurement circuit for the inductive tip clearance sensor 10 utilizing two sensing coils 20A and 20B. $L_{si}$ and $R_{si}$ (i=1, 2) represents the series inductance and resistance of each sensing coil 20A-B. In addition, each sensing coil 20A-B is electrically connected in parallel with an external capacitor $C_{pi}$ to form a parallel LC resonant circuit that has a unique resonance frequency. A combined excitation signal (or combined signal) (Vo) generated by a function generator 103 that includes two sine (i.e. AC—alternating current) waves (or excitation signals) whose frequencies are close to the resonance frequencies of the two sensing coils 20A and 20B is applied to the coils 20A-B, while only one combined response Vout needs to be measured by any suitable data acquisition (DAQ) device provided by the electronic measurement device 80. In some embodiments, the function generator 103 may be incorporated as part of the electronic measurement device 80. Because the signal from each of the sensing coils 20A-B exhibits a peak amplitude at its resonance frequency, the signals for each individual channel can be recovered by the DAQ from the combined response Vout by taking the spectrum components at each resonance frequency. The inductance change for each sensing coil 20A-B can therefore be calculated from individual signals. Further details associated with the use of resonance frequency division multiplexing (RFDM) is provided by "High Throughput Wear Debris Detection in Lubricants Using a Resonance Frequency Division Multiplexed Sensor", Du L, Zhu X, Han Y and Zhe J, Tribology Lett. 51, 2013, which is incorporated herein by reference. It should be appreciated that the use of RFDM with the sensor 10 reduces the complexity of the signal measurements that need to be performed when multiple sensing coils 20 are used, and improves the signal-to-noise ratio for each sensing coil. However, it should be appreciated that RFDM is not required when multiple coils 20 are utilized, as any suitable multiplexing processing technique may be used.

It should be appreciated that in some embodiments, the electronic measurement device or controller 80 may include any suitable processing or computing device, which includes the necessary hardware, software or combination thereof to generate the combined excitation signal (Vo), such as that generated by function generator 103. In addition the electronic measurement device 80 may be configured to perform data acquisition functions (DAQ), as well as to process the combined response, Vout, using any suitable technique including RFDM. Thus, the present invention enables multiple clearance measurements to be performed with one input (combined excitation signal Vo), and one output (Vout), which reduces that complexity of the measurements. This is in contrast to prior art techniques whereby multiple measurements require multiple inputs (excitation source) and multiple signal/outputs.

In some embodiments, the electronic measuring device 80 may be configured to communicate clearance measurement data through a wired or wireless network to a remote computer system for further processing and/or report generation.

EXPERIMENTAL RESULTS

Figure 3:
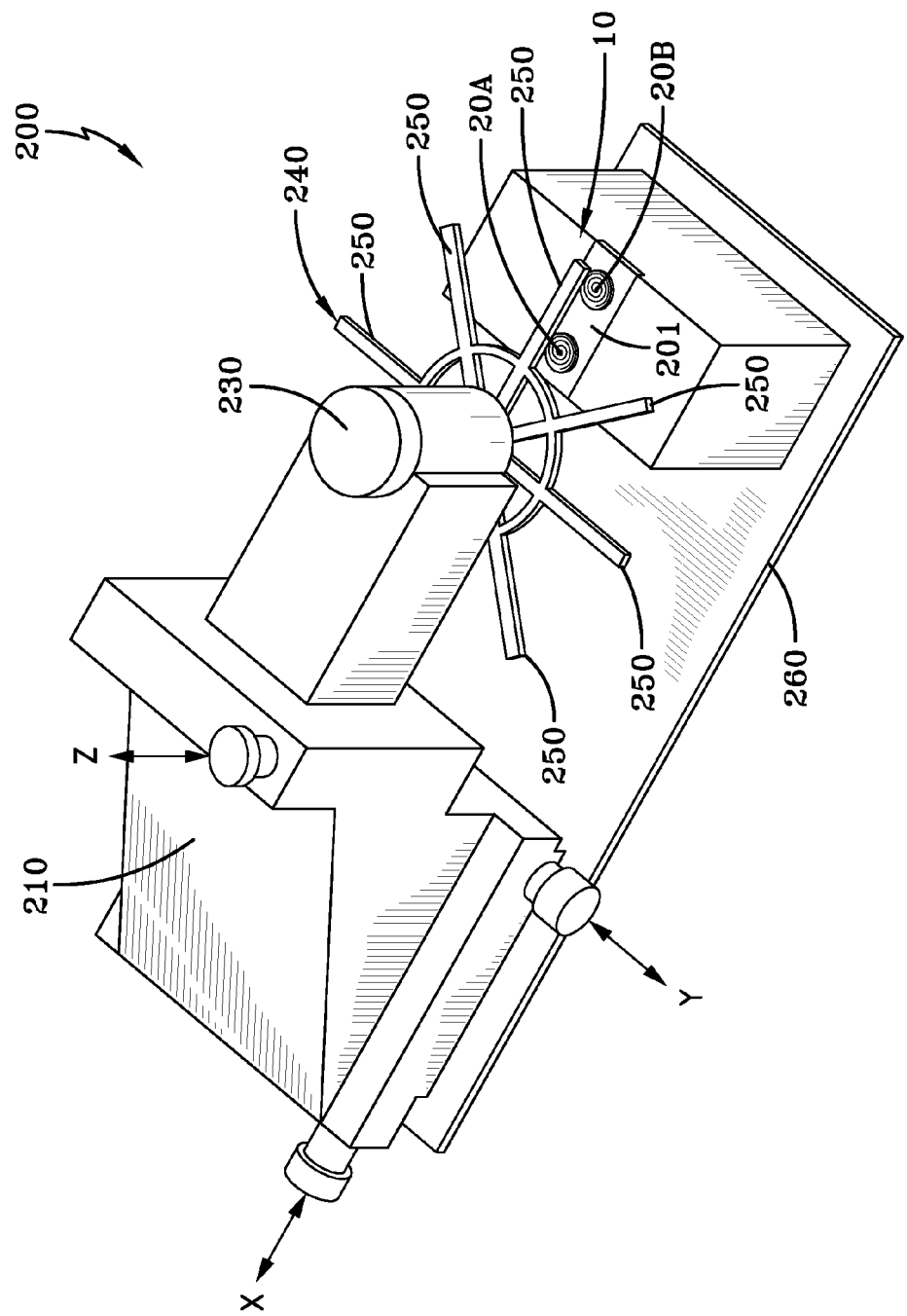
FIG. 3 is a perspective view of an apparatus used to test the inductive sensor in accordance with the concepts of the present invention.

FIG. 3 shows a bench-top test device or rig 200 that includes the inductive tip clearance sensor 10 mounted on a support surface 201. This test device 200 includes a 3-axis high-precision stage 210, a high-speed optical chopper 230 and an aluminum chopper disc 240 (25/30 dual-slot blade, 102 mm in diameter and 1 mm in thickness). The chopper disc 240 initially had 30 blades on the outer rim. By carefully cutting 20 blades off, only 10 blades 250 were left and uniformly distributed on the outer rim, which were used to simulate the rotor blade tips of a turbine. The distance between the neighboring two blades 250 was approximately 26 mm at the tip. Each blade was about 18 mm long. A 3-axis precision stage (7T38XYZ Translation System, Standa Ltd.) was used to hold the chopper disc 240 and to make fine adjustments to the clearance between the inductive sensor 10 and the blade surface with a resolution of 10 um. The optical chopper 230 (SR450, Stanford Research Systems, Inc.) was used to drive the chopper disc 240 with a speed ranging from about 0 to 8000 RPM (revolutions per minute). The bench top test device 200 was installed on a damped optical table 260 (RS 2000, Newport) to suppress environmental vibration.

To demonstrate that the sensor 10 is able to detect tip clearances at different positions of each blade 250, the chopper disc 240, was modified by attaching a 1 mm thick aluminum strip 251 (8 mm in length, with the same width as the blade) on the bottom of the outer edge of blades 250, denoted by #'s 1, 5 and 9, as shown in FIGS. 4A-C. Before testing, blade #1 was adjusted to be in contact with sensing coil 20B; whereby the tip clearance was defined as $TC_{12}=0$. Next, the precision stage 210 was used to adjust the tip clearance ($TC_{11}$ and $TC_{12}$) to the desired value. It should be appreciated that tip clearances $TC_{i1}$ (i=1, 2 ... 10) and $TC_{i2}$ (i=2-4, 6-8, and 10) for all ten blades 250, #1-10, were similar, but with small variations because of the distortion caused by blade cutting and strip installation. Similarly, tip clearances $TC_{i2}$ (i=1, 5, and 9) also had small differences.

Calibration

The inductance change of the tip clearance sensor 10 not only depends on the tip clearance, but also depends on the material, volume and geometry of the blades being monitored. To acquire accurate tip clearance measurements, calibration curves for measuring blade tip clearances between the modified chopper disc blades 250 and the two sensing coils 20A-B were conducted. The high precision 3-axis stage 210 holding the chopper disc 240 was used to control the tip clearance. A precision LCR meter (E4980A, Agilent) was used to measure the inductance $L_{si}$ of both sensing coils 20A-B.

Figure 5A:
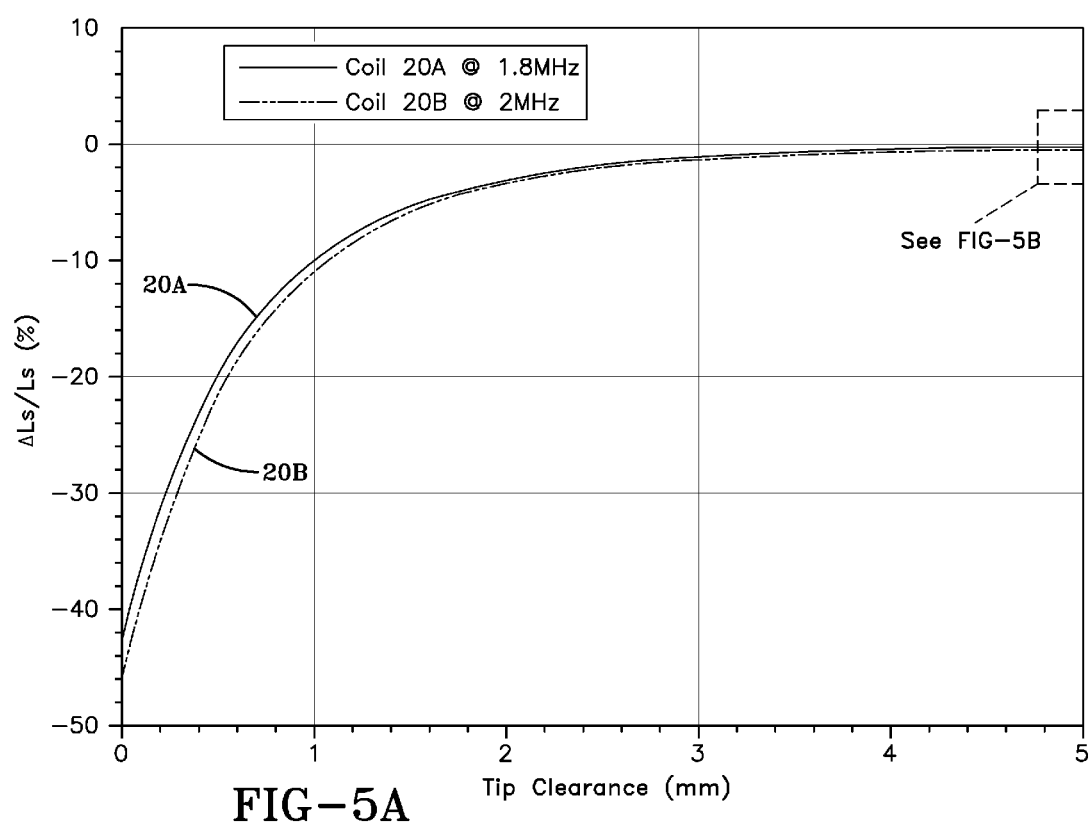
FIG. 5A is a calibration curve for the sensing coils in accordance with the concepts of the present invention.

Because the ten blades 250 of the chopper disc 240 are of the same size, blade #2 was selected for calibration. First, the base inductance of each sensing coil 20A-B (inductance Ls without a blade on top of the sensing coils 20A-B) was measured at the selected excitation frequencies (i.e. 1.8 MHz for sensing coil 20A and 2 MHz for sensing coil 20B). Next, the stage 210 was used to move the selected chopper blade 250 into contact with the sensing coil (TC=0). The chopper disc 240 was then raised in direction Z from 0 to 5 mm with a step size of about 10 um. At each Z-position, the inductance of each sensing coil 20A-B was measured by an LCR (inductance, capacitance and resistance) meter. The change in $\Delta L_S/L_S$ as a function of tip clearance is plotted, as shown in FIG. 5A. It should be appreciated that in FIGS. 5A-B sensing coil 20B has a slightly higher sensitivity than sensing coil 20A. This is because the use of a higher excitation frequency for coil 20B induces a larger eddy current in the blade tip, which results in a higher sensitivity. The calibration curve of the sensing coil 20B for blade #1 (with an added strip) and blade #2 (without a strip) at position P2 are almost the same from experimental data.

Figure 5B:
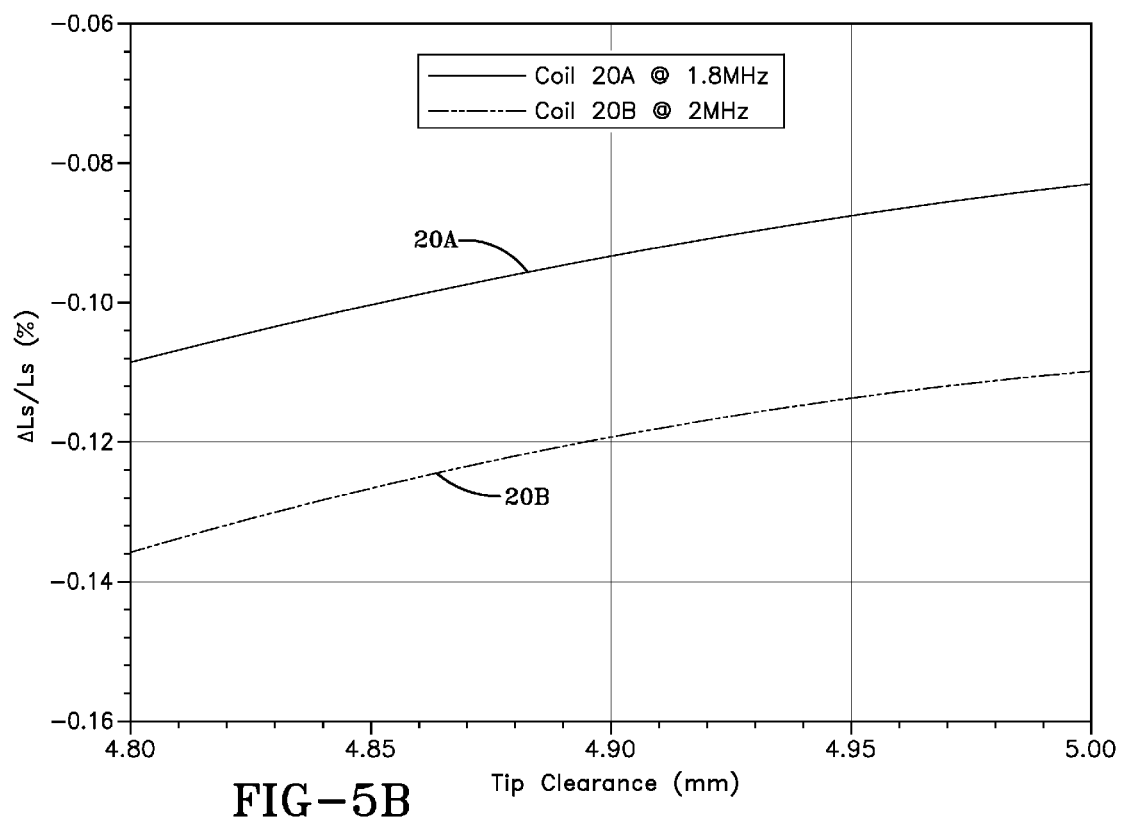
FIG. 5B is an alternative calibration curve for the sensing coils in accordance with the concepts of the present invention.

FIGS. 5A-B shows that the sensitivity drops significantly when the tip clearance becomes large. The reason for this is that the magnetic field strength decreases dramatically away from the planar coils 20A-B. When tip clearance is about 5 mm, a 10 um variation of the tip clearance resulted in an inductance change in coil 20 A of approximately 0.003% (FIG. 5B). From a previous study, the detectable limitation for the parallel LC resonance technique is approximately 0.002%. Thus, the resolution of the sensor 10 should be less than 10 um when the absolute tip clearance is 5 mm. When the absolute tip clearance is less than 5 mm, the measurement resolution is higher. For instance, from FIGS. 4A-C, it was calculated that when TC=1 mm, a 10 um variation in the tip clearance resulted in an inductance change in sensing coil 20A of about 0.15%, which suggests that the sensing resolution of sensor 10 may reach as high as about 2 um.

Dynamic Testing

To validate the ability of the sensor 10 to measure highly dynamic tip clearances, the tip clearance sensor 10 was tested and validated by using the bench-top test device shown in FIG. 3. The 10-blade chopper disc 240, shown in FIGS. 4A-C, was rotated to mimic a high speed turbine rotor. Each chopper blade 250 was used to simulate a rotor blade tip. Two experiments were conducted when $TC_{12}$ was set to 1.20 mm and 3.60 mm. To set up $TC_{12}$, first the tip of blade #1 was moved in contact with sensing coil 20B. Next, the precision stage 210 was used to move the chopper disc 240 up by a distance of about 1.2 mm, and in a direction Z of about 3.60 mm. Before the dynamic testing, the tip clearances were measured, $TC_{i1}$ (i=1, 2, 3 . . . 10) and $TC_{i2}$ (i=2, 3 . . . 10) for all blades 250 using the calibration curves shown in FIG. 5. The results are shown in table 1, shown in FIG. 6. It should be appreciated that the variations in tip clearances TC for different blades 250 were caused by machining distortion and strip 251 installation. Next, dynamic testing was conducted by driving the 10-blade chopper disc 240 to rotate clockwise at about 8,000 RPM.

Resonance frequency division multiplexing (RFDM) was applied to the signals generated from the sensor 10, which uses the two sensing coils 20A and 20B. The procedure for using RFDM, is described as follows. $L_{si}$ and $R_{si}$, shown in FIG. 2, were measured using the Agilent E4980A precision LCR meter. Using these measured values, two external capacitors, 12.1 nF and 9.1 nF, were selected for sensing coil 20 A and 20B, respectively, by $$f_{resonant-1} = \frac{1}{2\pi\sqrt{L_{si}C_{pi}}},$$

Eq. (1), in order to achieve the selected resonance frequencies of 1.8 MHz and 2 MHz. It should be appreciated that the capacitors are placed in parallel with the coils 20A-B. Subsequently, the exact resonances frequencies for the two sensing coils were experimentally determined to be about 1.81 MHz and 2.01 MHz. A combination sinusoidal wave (10 Vpp, including 1.81 MHz and 2.01 MHz excitation signals) generated by an Agilent 33 220A function generator was used to excite the sensor 10. A Gage Razor CompuScope 14-bit multi-channel digitizer was used to measure and record the voltage output (Vout) at a 100 MHz sampling rate in all experiments. Once the voltage output was recorded, the data was then processed in MATLAB to calculate the inductive changes of each sensing coil. First, one second of Vout was divided into many segments of data, with each segment defining 1 us of data. Cubic spline interpolation was then applied to each segment of Vout to reduce the digitization errors caused by the data acquisition. A Fast Fourier Transform (FFT) was conducted for each segment of Vout data to find out the peak values of the individual voltage components at the two measurement frequencies. Then, three layers of a 1D (one dimensional) stationary wavelet transform (SWT) was performed on each voltage component in MATLAB to improve the signal-to-noise ratio of the peak value signals. Next, the inductance of each sensing coil $L_{si}$ (i=1, 2), representing the tip clearance at positions 1 and 2, was calculated using software written in MATLAB. Finally, the tip clearance at two different positions for each rotor blade 250 is able to be obtained from the calibration curves shown in FIGS. 5A-B.

Figure 7A:
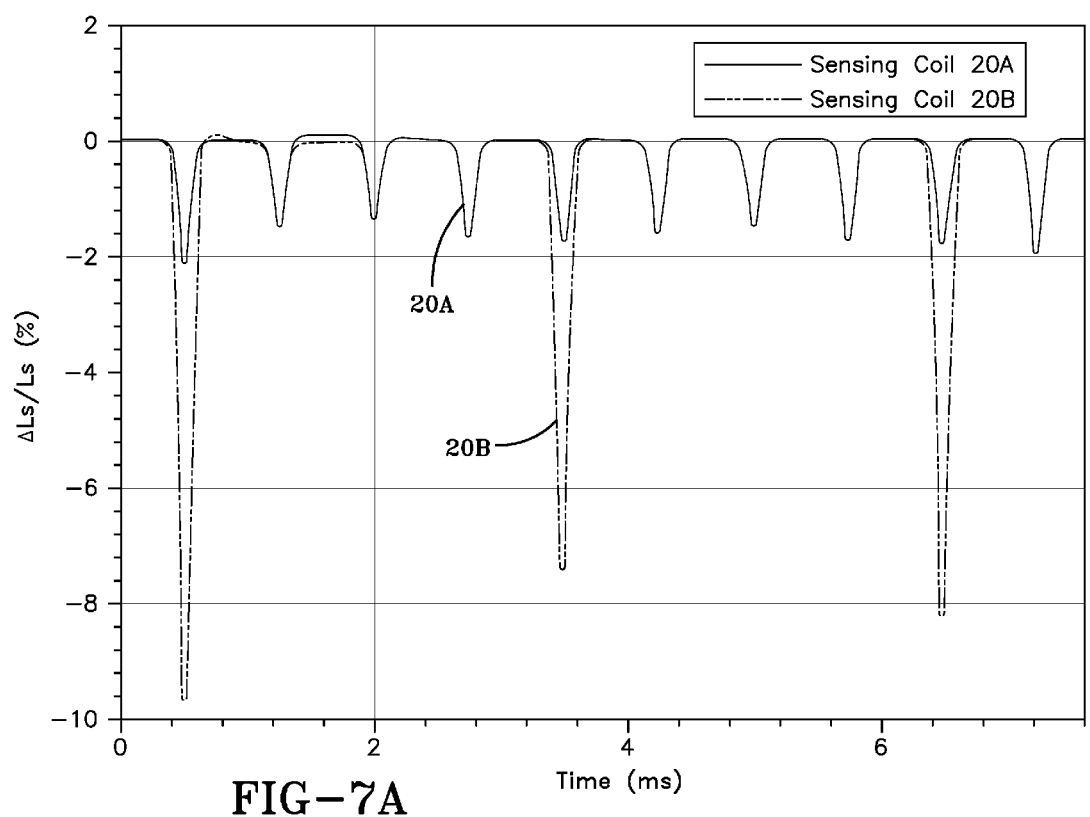
FIG. 7A is a graph showing measured relative inductance changes obtained from dynamic measurement results during a single revolution for $TC_{12}$=1.20 mm and $TC_{11}$=2.20 mm in accordance with the concepts of the present invention.
Figure 7B:
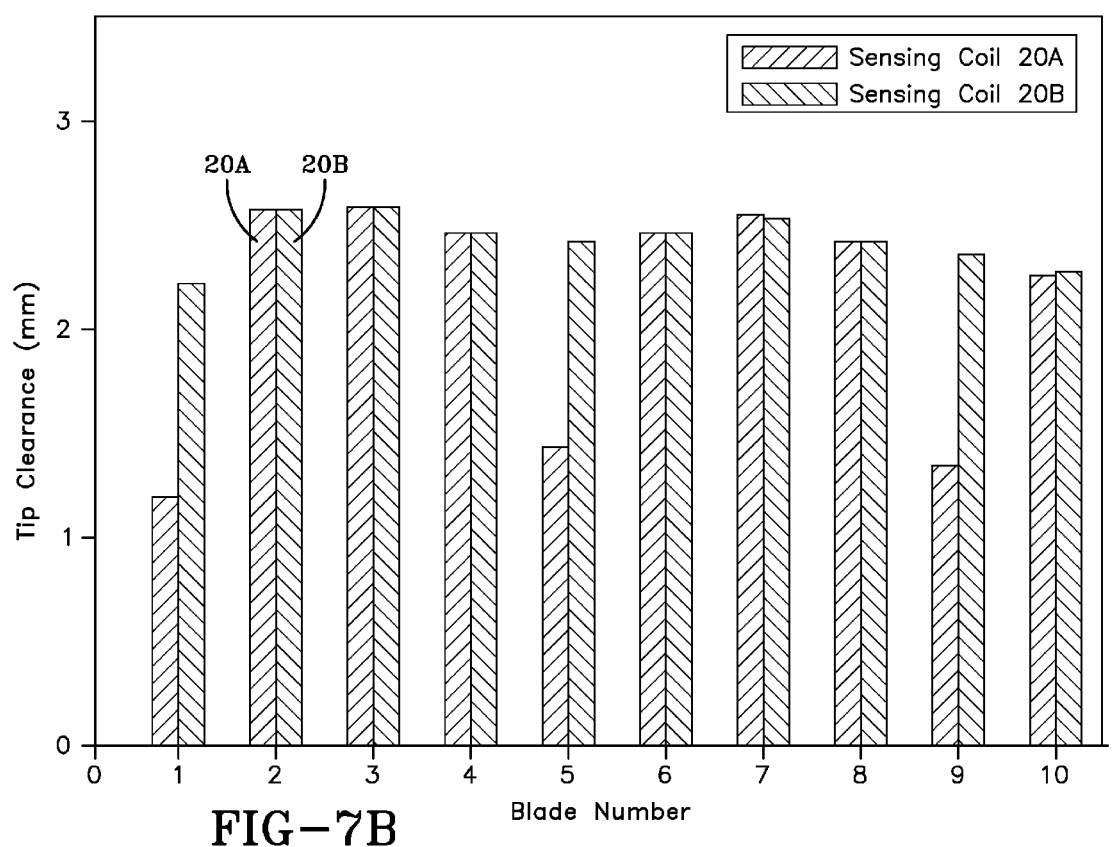
FIG. 7B is a graph showing calculated average tip clearances during 10 revolutions obtained from dynamic measurement results during 10 revolutions for $TC_{12}$=1.20 mm and $TC_{11}$=2.20 mm in accordance with the concepts of the present invention.
Figure 8A:
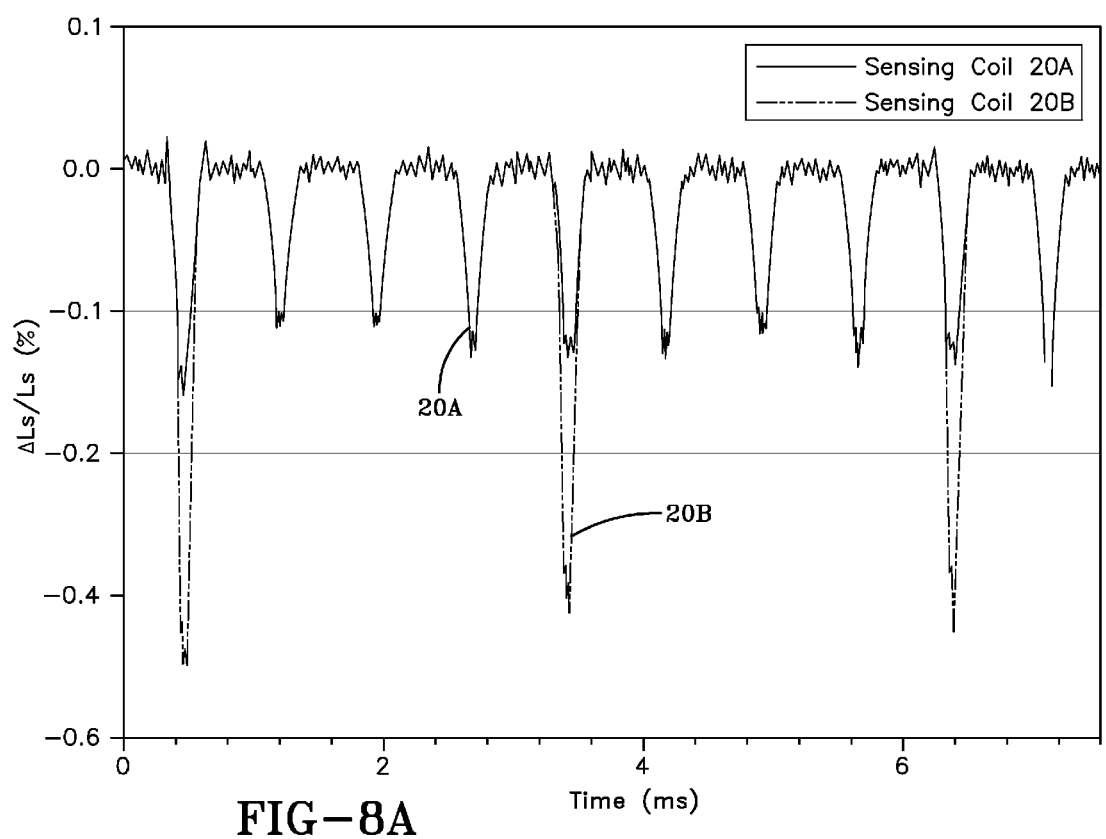
FIG. 8A is a graph showing measured relative inductance changes obtained from dynamic measurement results during a single revolution for $TC_{12}$=3.60 mm and $TC_{11}$=4.60 mm in accordance with the concepts of the present invention.
Figure 8B:
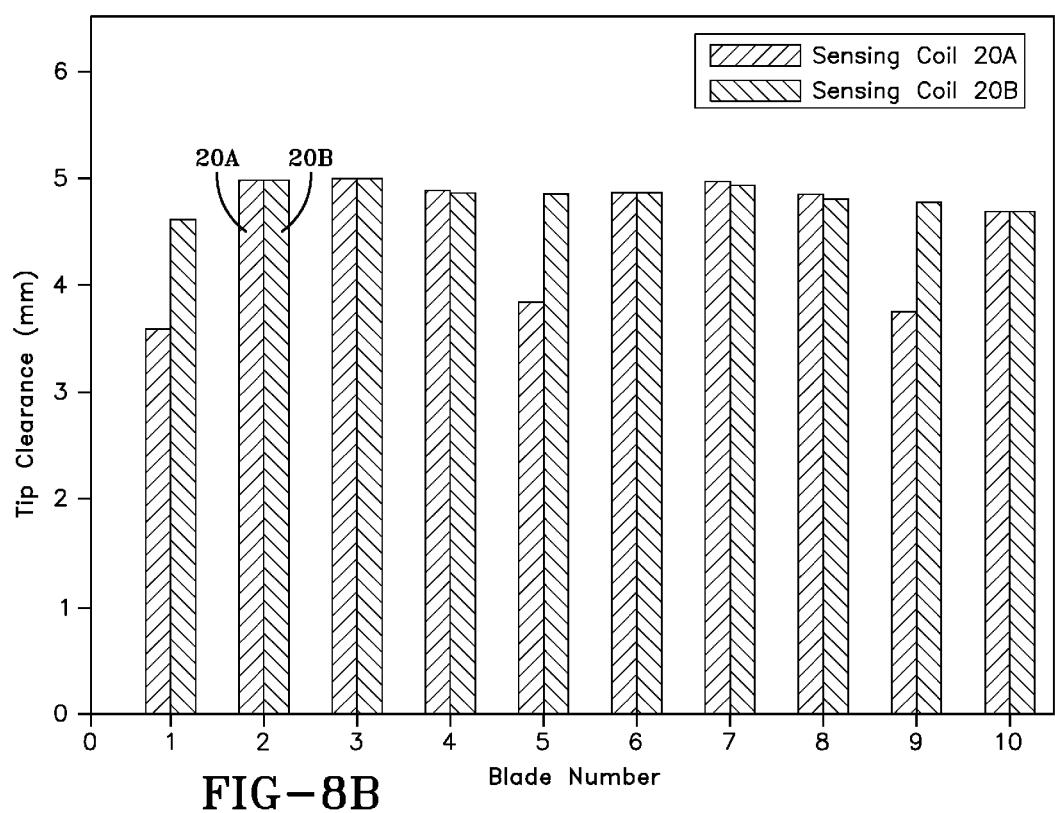
FIG. 8B is a graph showing calculated average tip clearances during 10 revolutions obtained from dynamic measurement results during a 10 revolutions for $TC_{12}$=3.60 mm and $TC_{11}$=4.60 mm in accordance with the concepts of the present invention.

FIGS. 7A and 8A illustrate the measurement results during one single revolution when $TC_{12}$ was 1.20 mm and 3.60 mm, respectively. As shown in FIGS. 7A and 8A, ten negative inductive pulses were observed for each sensing coil 20A-B. Each negative inductive pulse represents one blade 250 passing the sensing coils 20A-B. The $1^{st}$, $5^{th}$, and $9^{th}$ pulses measured by sensing coil 20B have the largest magnitude because blades #1, 5 and 9 have the smallest tip clearance at position P2, which results in larger eddy currents generated in the blades. FIGS. 7B and 8B show the measured average tip clearance values during ten revolutions, calculated from the calibration curves shown in FIG. 5. The maximum variation in tip clearance measured for each blade is 8 um (not shown). The measured average tip clearances of the blades 250 at 8,000 RPM are in good agreement with the set tip clearances, shown in table 1 . For example, in FIG. 7B, the measured average tip clearances of blades #1, #5 and #9 are 1.19 mm, 1.42 mm and 1.35 mm, which are very close to the set values 1.20 mm, 1.43 mm, and 1.36 mm. In FIG. 8B, the differences between the measured tip clearances (including changes in inductance FIG. 8A) at position P2 (measured by sensing coil 20B) and position P1 (measured by sensing coil 20A) are 1 mm, 1.01 mm and 1.01 mm for blades #1, #5 and #9, which accurately reflect the thickness of the attached strip (1 mm).

It should be appreciated that, as shown in FIGS. 7A and 8A, each inductive pulse contains approximately 400 data points. To accurately reflect the peak shape and peak value, 40 data points for a pulse should be adequate. This implies that the tip clearance sensor 10 of the present invention is capable of detecting blade tip clearances for turbine machines operated at a variety of RPMs, including 80,000 RPMs for example.

Figure 9A:
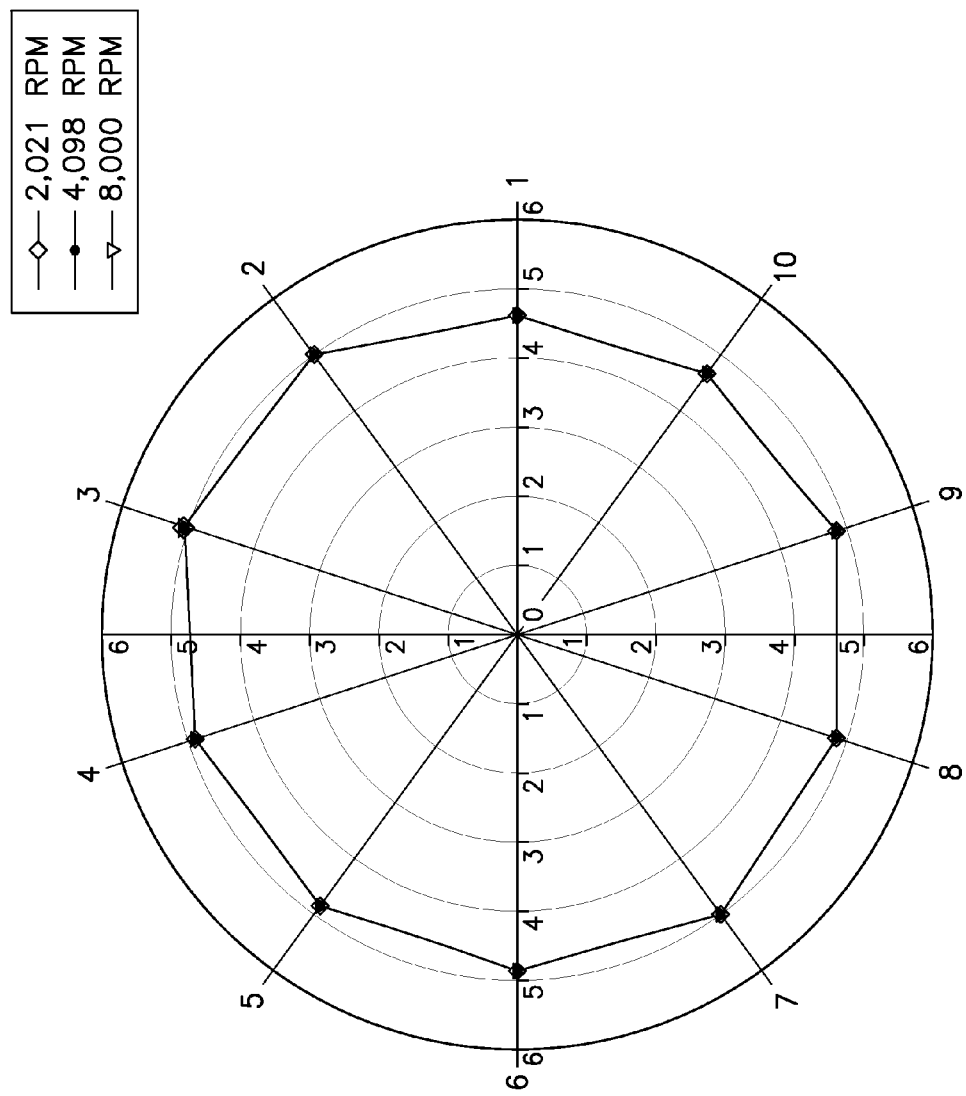
FIG. 9A is a graph showing measured tip clearances using a test setup for $TC_{12}$=3.60 mm and $TC_{11}$=4.60 mm at three different rotating speeds, 2,012, 4,098, and 8,000 RPMs at position P1 in accordance with the concepts of the present invention.
Figure 9B:
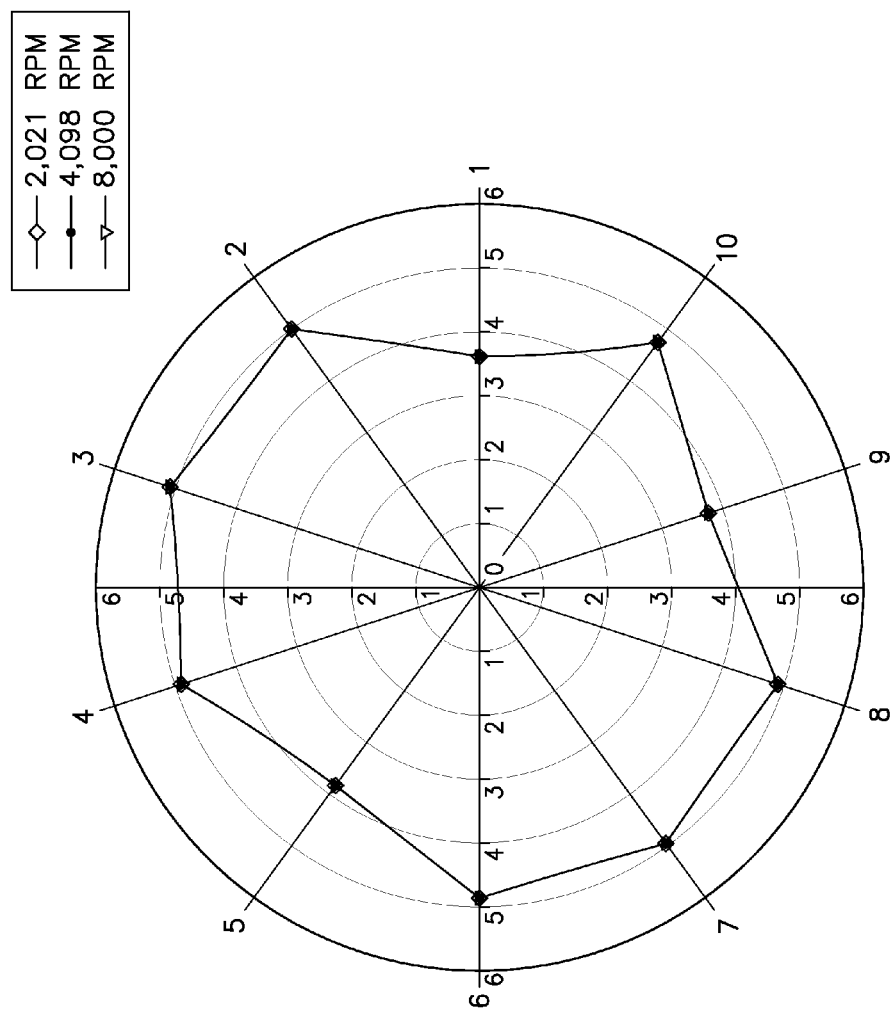
FIG. 9B is a graph showing measured tip clearances using a test setup for $TC_{12}$=3.60 mm and $TC_{11}$=4.60 mm at three different rotating speeds, 2,012, 4,098, and 8,000 RPMs at position P2 in accordance with the concepts of the present invention.

Next, the sensor 10 was tested at three different rotating speeds, 2,021, 4,098, and 8,000 RPMs. For each rotating speed, one second of response data for the two sensing coils 20A and 20B was continuously recorded and processed to obtain the tip clearances for all blades 250 at the two positions. In this experiment, $TC_{12}$ was set as 3.60 mm. The average tip clearance values for each blade 250, calculated from the calibration curves, were plotted in polar plots, as shown in FIGS. 9A-B. FIG. 9A shows that the measured tip clearances at position P1 at the three rotating speeds were nearly the same with small variations, whereby the maximum variation is 12 um. The slightly large variation is possibly caused by mechanical vibration of the chopper shaft. Nevertheless, the measured average tip clearances are in good agreement with the set values at all rotation speeds, as shown in Table 1 of FIG. 6. Similarly, FIG. 9B shows that at position P2, the measured average tip clearances of blades #1, #5 and #9 were 3.59 mm, 3.84 mm, and 3.74 mm respectively, which are in good agreement with the set values (3.60 mm, 3.84 mm and 3.75 mm in Table 1). The error bar of each tip clearance measurement at each rotation speed is marked in the polar plots; they are invisible in the plots because the variations are very small (i.e. ranging from about 6 to 8 um). This indicates that the repeatability and reliability of the measurements are satisfactory at all rotation speeds.

Figure 10A:
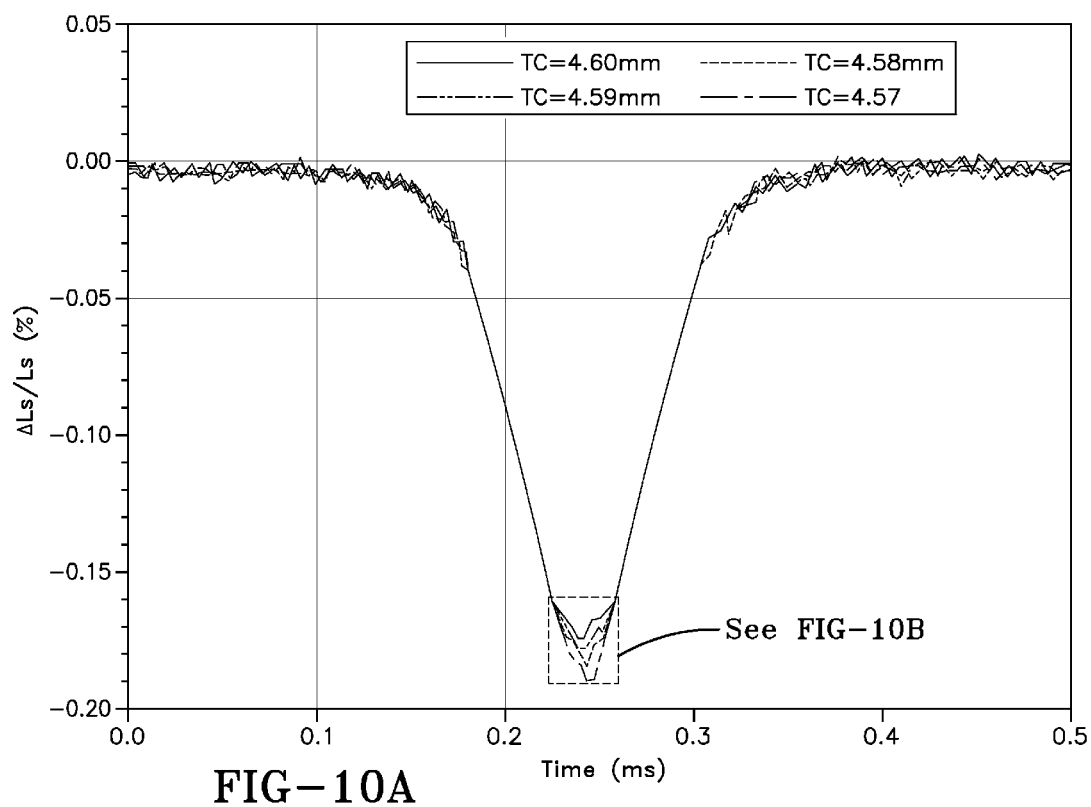
FIGS. 10A-B are graphs showing a comparison of the measured relative inductance change for blade #1 at position P1 in accordance with the concepts of the present invention.
Figure 10B:
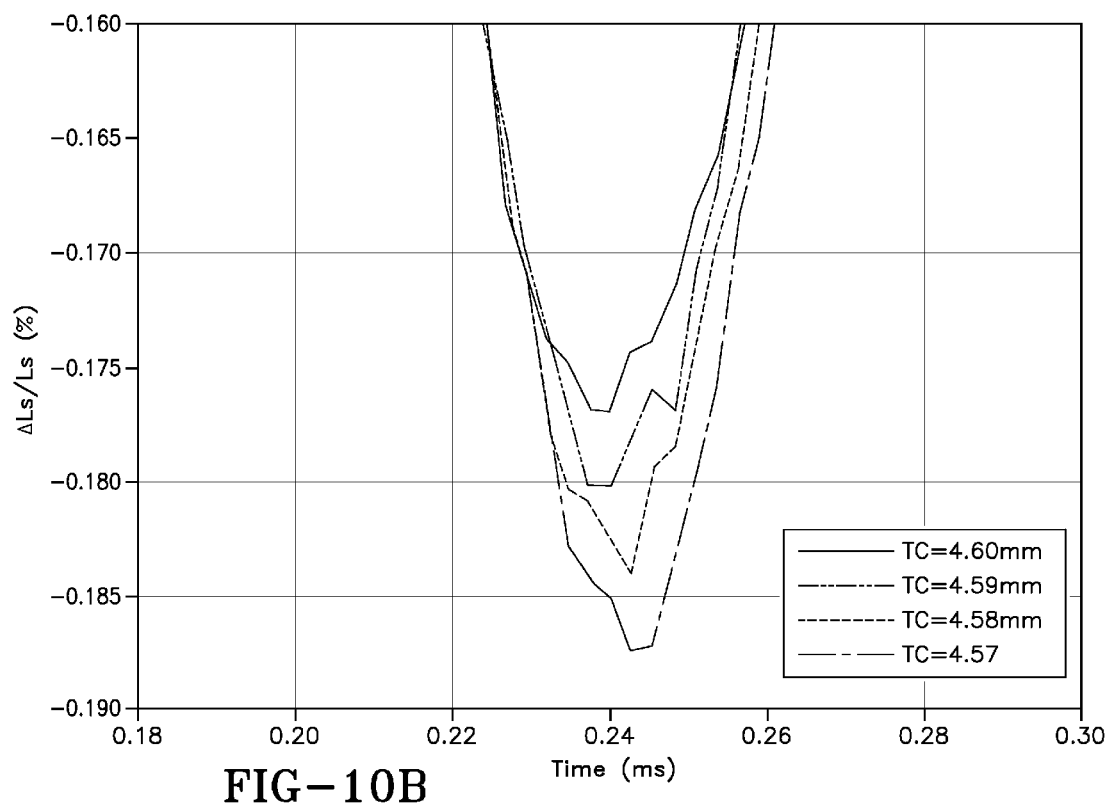

To analyze the sensitivity of the sensor 10 for dynamic measurements, the typical inductive pulses when blade #1 passes the sensing coil 20A at 8,000 RPM was plotted. The tip clearance TC was set to range from about 4.57 to 4.60 mm with a 10 um increment, as shown in FIGS. 10A-B. For each 10 um variation in tip clearance, the inductance change was approximately 0.003%, which is above the noise level 0.002%. This shows that the tip clearance sensor 10 of the present invention can detect a tip clearance TC change of less than 10 um. For comparison, the precision LCR meter cannot detect the dynamic tip clearance change at 8,000 RPM because its response time is 5.6 ms. In contrast to other inductive tip clearance sensors, the sensor 10 of the present invention is capable of detecting tip clearance variation with higher sensitivity, and with higher resolution as small as 10 um. The improvement in sensitivity and resolution of the sensor 10 is achieved by three factors: (1) higher sensitivity of the mini-sized planar coil 20, due to the fact that it has a smaller sensing zone than that of a 3D solenoid with the same coil turns, leading to a more concentrated magnetic flux field near the surface of the coil; (2) significantly improved signal-to-noise ratio due to the use of the parallel LC resonance technique [at the resonance frequency, the change in coil inductance (and in output voltage) caused by the passage of a blade is amplified by the resonance peak]; and (3) further improved signal-to-noise ratio due to the use of resonance frequency division multiplexing and stationary wavelet transform (SWT). The sensitivity of the inductive tip clearance sensor 10 can be further improved by inducing a sharper resonance peak; the sharper the resonance peak, the larger the amplification ratio for the impedance change caused by a blade.

Although only two sensing coils, 20A-B, were used in the experiments discussed above for concept-demonstration purpose, any number (e.g. one or more) of sensing coils 20 may be utilized by the sensor 10 for measuring any number of tip clearances TC along the camber line of a rotating blade, or the clearance of any other rotating member. As such, the combined input signal Vo is configured to have a number of sine waves that are associated with the respective number of coils 20 used. With the use of the resonance frequency division signal multiplexing/de-multiplexing technique, only one combined signal output Vout needs to be measured for all sensing coils 20. Thus, only one set of measurement electronics is needed by the present invention, making the sensor 10 more suitable for various applications.

It should be appreciated that while we only measured tip clearances ranging from 0 to 5 mm, the sensor 10 is capable of measuring tip clearances larger than 5 mm. For real rotor blade tip clearance measurements, it is predicted that the magnitude of the output signals will be larger with higher sensitivity because eddy currents would be stronger in real blades with a larger volume. In addition, although the maximum rotating speed used in the above experiments was about 8,000 RPM, as analyzed before, the inductive sensor 10 is capable of detecting tip clearances of up to 80,000 RPM or more due to the fast response time of the sensor 10. It should also be appreciated that the blade material may affect the response of the sensor 10. At a low excitation frequency (i.e. KHz level), for a ferrous blade the inductance change is influenced by both the conductivity and the permeability of the blade material. At a high excitation frequency (i.e. above MHz), eddy current becomes a dominant factor; while the influence of the magnetic permeability becomes small, a material's conductivity does affect the eddy current. The higher the conductivity, the larger the eddy current and the inductance change. Nevertheless, to acquire the accurate tip clearances TC for blades made of specific material and geometry, calibration is required before performing real measurements. The calibration curves will compensate for the difference in the response of the sensor caused by differences in the blade material properties.

One challenge for tip clearance detection is the fact that high temperature gas that is generated in or by rotating machinery, such as a turbine, could affect the output of the sensing coils 20. Previous studies show that although the base inductance of the planer coil was affected by environmental temperature, sensitivity of the inductive sensor 10 (i.e. the relative change in inductance as a function of tip clearance change) remains stable at a wide temperature range from 23°C to 600°C. Thus, the calibration curves obtained at room temperature are expected to be applicable to environmental temperatures of up to about 600°C. It should be appreciated that the magnet wire used to construct the sensing coils 20A-B can only function in temperatures up to about 200°C. However, other magnet wire materials to form the coils 20A-B may be used to allow the sensor 10 to have a higher operating temperature above 200°C. One technique for improving the operating temperature range of the sensor 10 is to use high temperature materials, such as platinum or tungsten as the magnet wires for the sensor coils. Micro-fabrication techniques can also be used to fabricate sensing coils with dense coil turns to further improve the sensitivity of the sensor 10 in a high temperature environment.

Thus, the present invention provides a multiplexed, high sensitivity inductive sensor for measuring clearance of high speed rotating metallic structures, such as a rotating blade tip. With multiple sensing coils 20A-B, the tip clearance sensor 10 is able to simultaneously detect blade tip clearances at various positions. By applying resonance frequency division multiplexing techniques, only one set of measurement electronics is required when multiple sensing coils are used. The use of parallel LC resonance measurements, coupled with signal multiplexing enables high sensitivity and high resolution sensor operation. Dynamic experiments using a bench-top test device demonstrated that the sensor 10 is capable of measuring blade tip clearances TC ranging from about 0 to 5 mm with a resolution of about 10 um. The blade tip clearance measurements are expected to be accurate for a large range of rotating speeds, ranging from 0 to about 80,000 RPMs for example. In contrast to other inductive tip clearance sensors, the sensitivity and resolutions of the sensor 10 has been significantly improved. The sensor 10 can also be modified to include any number of sensing coils 20 for monitoring any number of blade tip clearances, such as that of rotary machinery, which have any number of rotating members or rotating blades, such as turbines and compressors for example.

Therefore, one advantage of a high sensitivity inductive sensor for measuring blade tip clearance of the present invention is that the sensor is able to measure tip clearance at high blade speeds. Yet another advantage of the high sensitivity inductive sensor for measuring blade tip clearance of the present invention is that multiple sensing coils may be used, whereby the tip clearance sensor is able to simultaneously detect blade tip clearances TC at various positions. Still another advantage of the high sensitivity inductive sensor for measuring blade tip clearance of the present invention is that by applying resonance frequency division multiplexing techniques, only one set of measurement electronics is required when multiple sensing coils are used.

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A sensor for measuring a clearance of a tip of a rotating metallic structure, the sensor comprising:

a plurality of series coupled wire coils, each said wire coil coupled in parallel with a capacitor, and each said wire coil having a planar face that includes a plurality of coil turns; and a controller coupled in series with said plurality of wire coils, said controller configured to generate a combined AC (alternating current) signal that includes a plurality of excitation signals that are each respectively associated with one of said plurality of wire coils;

wherein said controller simultaneously measures the change in inductance of said plurality of wire coils caused by the position of the tip of the rotating structure relative to said planar face of each of said plurality of wire coils, such that said change in inductance is associated by said controller with a measurement of the clearance between said planar face of each of said plurality of wire coils and the tip of the metallic structure.

2. The sensor of claim 1, wherein said plurality of wire coils each comprise a spiral, square, rectangular, or hexagonal shape.

3. The sensor of claim 1, wherein said plurality of wire coils each have 10 or less turns.

4. The sensor of claim 1, wherein said plurality of wire coils each have 10 or more turns.

5. The sensor of claim 1, wherein the sensor utilizes resonance frequency division multiplexing to format said excitation signals, such that said controller measures a voltage response of said plurality of wire coils to determine said change in inductance of each one of said plurality of wire coils.

6. The sensor of claim 1, wherein said plurality of wire coils are each disposed between a first dielectric layer and a second dielectric layer.

7. The sensor of claim 6, wherein said first and second dielectric layers are heat resistant.

8. The sensor of claim 6, wherein said first dielectric layer and said second dielectric layer are formed of ceramic material.

9. The sensor of claim 1, wherein each one said plurality of wire coils has a thickness of about 0.5 mm.

10. The sensor of claim 1, wherein one or more of said plurality of wire coils comprises a plurality of coils that are stacked upon each other.

11. The sensor of claim 1, wherein the metallic structure comprises a turbine blade.

12. The sensor of claim 1, wherein the metallic structure comprises a compressor blade.

13. The sensor of claim 1, wherein said plurality of excitation signals each has a resonance frequency that is respectively associated with one of said plurality of wire coils.

14. The sensor of claim 13, wherein said controller measures a voltage response of said plurality of wire coils to determine said change in inductance of each one of said plurality of wire coils.

15. The sensor of claim 1, wherein said wire coils are formed of magnet wire.

16. The sensor of claim 1, wherein each said planar face of said plurality of coils is arranged so that the tip of the metallic structure passes across said plurality of wire coils.

17. A method of measuring clearance of a metallic structure comprising:
   providing a detection circuit including a plurality of series coupled wire coils that are each coupled in parallel with a capacitor to form respective detection units, and each said coil having a planar face that includes a plurality of coil turns;
   applying a combined AC (alternating current) signal to the plurality of series coupled coils, said combined AC signal including a plurality of excitation signals having a frequency that is the resonance frequency of the respective detection units;
   moving a metallic structure relative to said coils;
   identifying an output voltage of one or more of said detection units;
   identifying a change in inductance of one or more of said coils based on said output voltage; and
   determining a clearance distance between said planar face of one or more of said coils and the metallic structure based on said change in inductance of one or more of said coils.

18. The method of claim 17, further comprising:
   identifying a combined voltage response of said detection circuit; and
   determining said output voltage of one or more of said detection units from said combined voltage response.

19. The method of claim 17, wherein the metallic structure includes a tip, and said clearance distance determined is between said planar face of one or more of said coils and the tip of the metallic structure.

* * * * *